United States Patent
Tsai et al.

(10) Patent No.: US 8,171,025 B2
(45) Date of Patent: May 1, 2012

(54) DENSITY-BASED DATA CLUSTERING METHOD

(75) Inventors: Cheng-Fa Tsai, Pingtung County (TW); Chien-Tsung Wu, Kaohsiung County (TW)

(73) Assignee: National Pingtung University Of Science & Technology, Neipu Hsiang, Pingtung County (TW)

( * ) Notice: Subject to any disclaimer, the term of this patent is extended or adjusted under 35 U.S.C. 154(b) by 214 days.

(21) Appl. No.: 12/683,202

(22) Filed: Jan. 6, 2010

(65) Prior Publication Data

US 2011/0055212 A1 Mar. 3, 2011

(30) Foreign Application Priority Data

Sep. 1, 2009 (TW) .............................. 98129387 A

(51) Int. Cl.
*G06F 17/30* (2006.01)

(52) U.S. Cl. ........ 707/736; 707/737; 707/738; 707/739; 707/740

(58) Field of Classification Search ........... 707/736–737
See application file for complete search history.

(56) References Cited

U.S. PATENT DOCUMENTS

| 5,832,182 | A | 11/1998 | Zhang et al. |
| 6,003,029 | A | 12/1999 | Agrawal et al. |
| 6,148,295 | A * | 11/2000 | Megiddo et al. ...................... 1/1 |
| 6,263,334 | B1 * | 7/2001 | Fayyad et al. ................. 707/737 |
| 6,549,907 | B1 | 4/2003 | Fayyad et al. |
| 6,640,227 | B1 | 10/2003 | Andreev |
| 6,714,679 | B1 * | 3/2004 | Scola et al. ................... 382/199 |
| 2002/0107858 | A1 * | 8/2002 | Lundahl et al. ............... 707/100 |
| 2002/0147703 | A1 * | 10/2002 | Yu et al. ............................ 707/2 |
| 2002/0169772 | A1 * | 11/2002 | Aggarwal ........................ 707/6 |
| 2003/0153823 | A1 * | 8/2003 | Geiser et al. .................. 600/407 |
| 2004/0070585 | A1 * | 4/2004 | Papiernik et al. ............. 345/420 |
| 2005/0286865 | A1 * | 12/2005 | Dorai et al. ..................... 386/69 |
| 2007/0116342 | A1 * | 5/2007 | Zarkh et al. ................... 382/130 |
| 2007/0250476 | A1 * | 10/2007 | Krasnik ............................ 707/2 |
| 2009/0043220 | A1 * | 2/2009 | Montgomery et al. ....... 600/544 |

* cited by examiner

*Primary Examiner* — Hanh Thai

(74) *Attorney, Agent, or Firm* — Muncy, Geissler, Olds & Lowe, PLLC

(57) ABSTRACT

A density-based data clustering method, comprising a parameter-setting step for setting a scanning radius and a minimum threshold value, a dividing step for dividing a space of a plurality of data points according to the scanning radius, a data-retrieving step for retrieving one data point out of the plurality of data points as a core data point, a searching step for calculating a distance between the core data point and each of the query points, a grouping determination step for determining whether a number of the neighboring points is smaller than the minimum threshold value.

3 Claims, 6 Drawing Sheets

DENSITY-BASED DATA CLUSTERING METHOD

BACKGROUND OF THE INVENTION

1. Field of the Invention

The present invention relates to a data clustering method and, more particularly, to a density-based data clustering method.

2. Description of the Related Art

Traditionally, the data clustering method is primarily based on the density of the data points. For example, based on a defined radius and a minimum threshold value of data point, if the density of data points of a certain area meets a required condition, a searching operation is performed for the area. Based on this, all areas that meet the required condition will be determined and merged together to obtain a resulted data clustering. The known representative data clustering methods comprise DBSCAN, IDBSCAN and FDBSCAN, as illustrated below:

1. DBSCAN Data Clustering Method:

The method was proposed by M. Ester et al. in 1996, as described below. The first step is randomly selecting one data point from a plurality of data points of a data set as an initial seed data point. The second step is determining whether the number of the data points within a circular range radially extended from the initial seed data point with a radius of R exceeds the minimum threshold value. If so, the data points within the range is categorized as the same cluster and are used as seed data points, and the extension operation is subsequently applied to other seed data points within the circular range. The third step is re-performing the previous second step until all data points of the data set are categorized. The traditional DBSCAN data clustering method performs the data clustering based on the density, so it is capable of filtering the noise data points (the data points with low density) and suitable for the irregular-patterned data points. However, this mechanism takes a considerable time for operation as all data points require the calculation of data point density within their own searching ranges. In addition, the method requires the calculation of the distance between a core point and each data point, an increased time consumption for data clustering is therefore inevitable.

2. IDBSCAN Data Clustering Method:

The method was proposed by B. Borah et al. in 2004 and improves upon the DBSCAN data clustering method by reducing the required data queries. The method creates 8 symbols on the border of the searching range radially extended from a seed point with a radius of R, with the 8 symbols spacing from each other evenly. Based on this, the number of the seed points is reduced by selecting only the data points that are close to the 8 symbols as seed points. As a result, the number of seed points is reduced and the time consumption is therefore reduced. However, the time reduced is limited. In general, although the IDBSCAN data clustering method reduces the seed points within a searching range of a radially extended seed point as lower as no more than 8 seed points, however, the time consumption is still increased for the seed points that are close to the extended seed point, as the seed points would have larger coverage. In addition, although the seed points within the searching range of an extended seed point is no more than 8, the time consumption is still considerable as the searching ranges of two adjacent seed points would overlap, resulting in a repeated extension of the seed points.

3. FDBSCAN Data Clustering Method:

The method was proposed by BING LIU et al. in 2006 and also improves upon the DBSCAN data clustering method by reducing the required data queries. The FDBSCAN method determines whether to merge two overlapped clusters into the same cluster according to the data points located within the overlapped area therebetween. Specifically, assume a first cluster is overlapped with a second cluster, with a plurality of data points located within the overlapped area of the first and second clusters. Based on this, the FDBSCAN method determines whether the number of data points of a searching range of any data point located within the overlapped area is greater than the minimum threshold value. If so, the first and second clusters are merged into the same cluster. In this way, the number of times of searching operation for data points is reduced, thereby improving over the DBSCAN method. However, the time reduced is limited.

In summary, although the above-mentioned data clustering methods are capable of efficiently detecting the irregular patterns and filtering the noise points, the required time for data clustering operation is considerable.

Therefore, there is a need to improve the above data clustering methods.

SUMMARY OF THE INVENTION

An embodiment of the invention discloses a density-based data clustering method, comprising a parameter-setting step, a dividing step, a data-retrieving step, a data-retrieving step, a searching step and a grouping determination step. The parameter-setting step sets a scanning radius and a minimum threshold value. The dividing step divides a space of a plurality of data points according to the scanning radius to obtain a plurality of grids, wherein the plurality of data points is distributed in the plurality of grids. The data-retrieving step retrieves one data point out of the plurality of data points as a core data point, and defines a grid where the core data point is located, as well as grids that surround the grid, as a query range, wherein the data points located in the query range are query points. The searching step calculates a distance between the core data point and each of the query points, determines a portion of the query points with the distance to the core data point equal to or smaller than the scanning radius, and defines the portion of the query points as neighboring points. The grouping determination step determines whether a number of the neighboring points is smaller than the minimum threshold value, defines the core data point and the neighboring points as noise points and re-performs the data-retrieving step if the number of the neighboring points is smaller than the minimum threshold value. The grouping determination step defines the core data point and the neighboring points as a cluster and performs a first determination step if the number of the neighboring points is not smaller than the minimum threshold value. Wherein, the first determination step determines whether the cluster overlaps with other clusters, performs a second determination step if the cluster overlaps with other clusters. The first determination step defines the cluster as a new cluster and re-performs the data-retrieving step if the cluster does not overlap with other clusters. The second determination step determines the data points located within an overlapped area of the clusters as cross core points, determines whether a number of the data points located within a searching range radially extended from any of the cross core points with a radius of the scanning radius is smaller than the minimum threshold value, re-performs the data-retrieving step if the number of the data points located within the searching range is smaller than the minimum threshold value, merges the overlapped clusters into the same cluster and performs a termination determination step if the number of the data points located within the searching range is not smaller than the minimum threshold value. The termination determination step determines whether all of the data points are clustered or defined as noise points, terminates the density-based data clustering method if all of the data points are clustered or defined as noise points, and re-performs the data-retrieving step if not all of the data points are clustered or defined as noise points.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
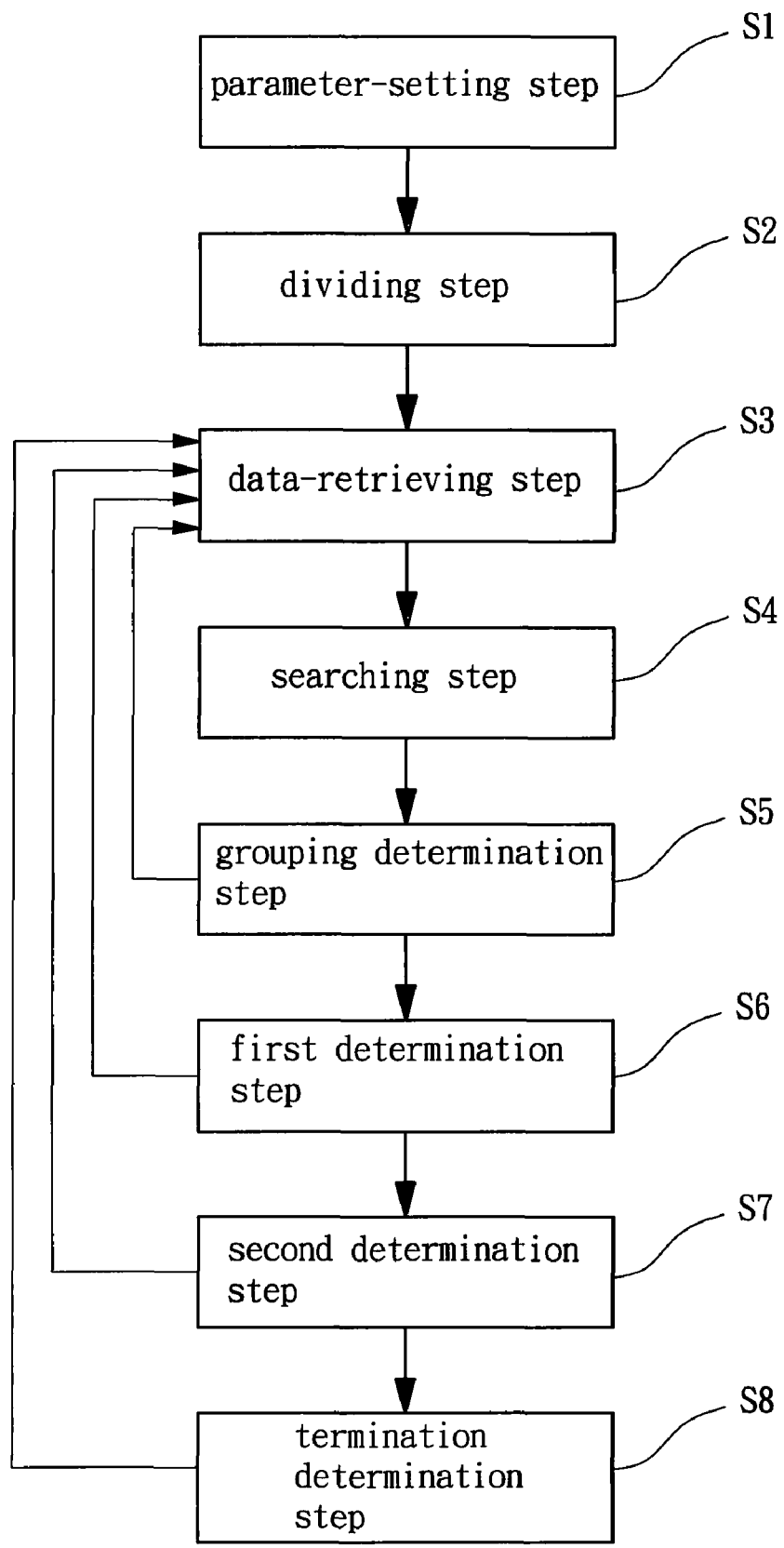
FIG. 1 is a flowchart illustrating a data clustering method according to a preferable embodiment of the invention.

In the various figures of the drawings, the same numerals designate the same or similar parts. Furthermore, when the term "first", "second", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
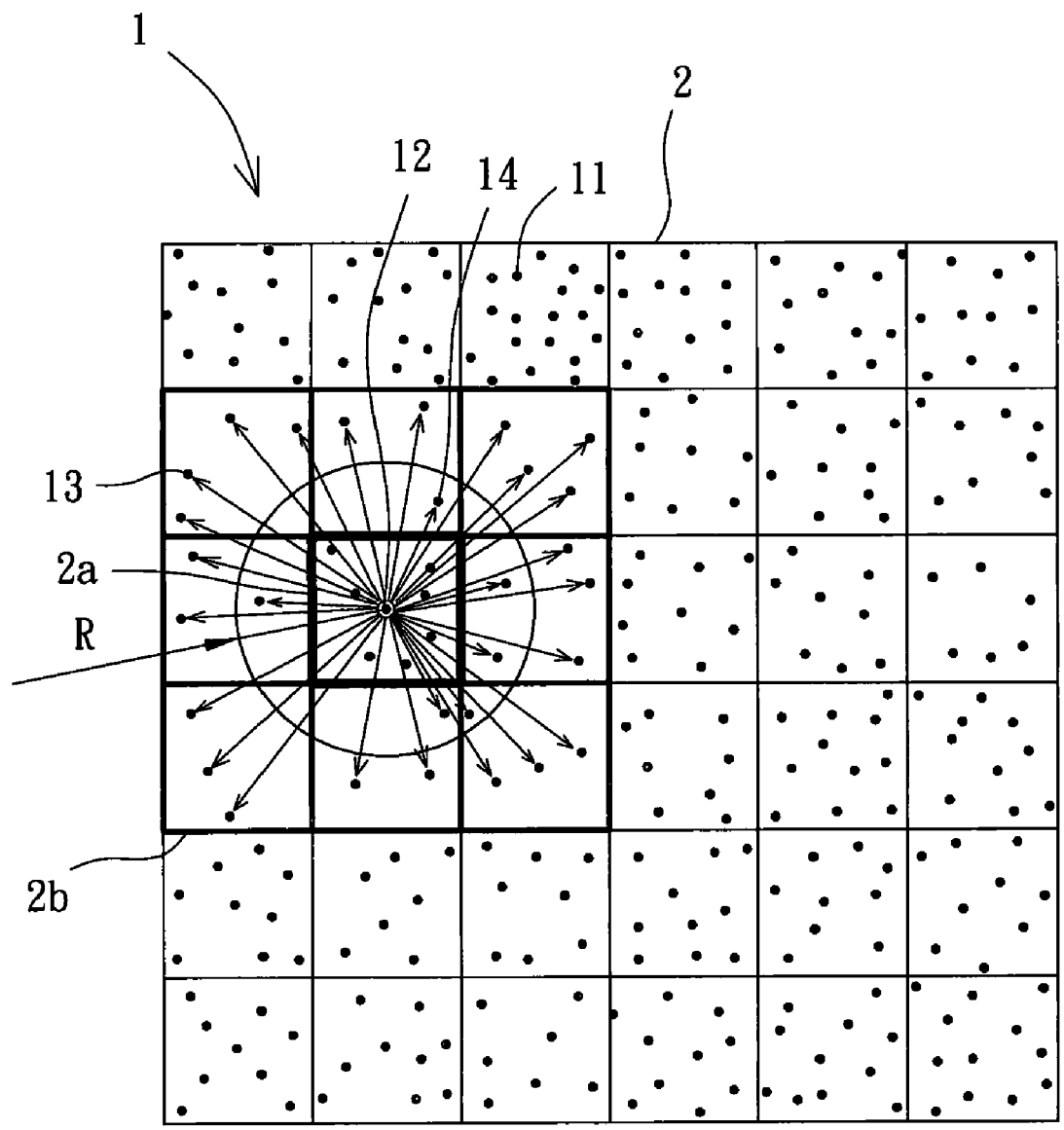
FIG. 2 is a diagram illustrating the dividing of the grids according to a preferable embodiment of the invention.

Referring to FIGS. 1 and 2, the preferred embodiment of data clustering method proposed by the invention is executed under a structure where a computer system is connected to at least a database that stores a data set 1 comprising a plurality of data points. The data clustering method of the invention comprises a parameter-setting step S1, a dividing step S2, a data-retrieving step S3, a searching step S4, a grouping determination step S5, a first determination step S6, a second determination step S7 and a termination determination step S8. Based on the above steps, the data clustering will be performed with high precision.

Referring to FIGS. 1 and 2, the parameter-setting step S1 of the invention defines a scanning radius R and a minimum threshold value. The invention herein defines a term "searching range" representing a circular range where a searching operation is performed. The circular range may be centered at and radially extended from any one of the plurality of data points 11 with a radius of the scanning radius R.

Referring to FIGS. 1 and 2, the dividing step S2 performs a dividing operation for the 2 dimensional space where the plurality of data points 11 are located on according to the scanning radius R. The operation is to obtain a plurality of grids 2, with the plurality of data points 11 located therein. The scanning radius R represents the size of the grids 2. For example, assume that the data set 1 is distributed in a 2-dimensional space and the border that encompasses the data set 1 is in a minimal value. In this case, if the scanning radius R is set as 2, the data set 1 is divided into a plurality of grids formed in a size of 2 by 2. In particular, if the data set 1 has a minimal border value of 100 by 100 in a 2-dimensional space and the scanning radius R is set as 2, each dimension is divided into 50 portions. As a result, the space is divided into a 50 by 50 metric having a total grids number of 2500.

Referring to FIGS. 1 and 2, the data-retrieving step S3 retrieves one data point 11 out of the plurality of data points 11 as a core data point 12, and defines a query range covering a grid 2a where the core data point 12 is located, as well as grids 2b that surround the grid 2a. The data-retrieving step S3 further defines the data points 11 within the query range as query points 13. Based on the grid structure, it will be efficient for the grid 2a to find out its surrounding grids 2b (as the 8 grids 2b shown in FIG. 2). In other words, the query range defined herein refers to as the range covered by the grid 2a and the surrounding grids 2b.

Referring to FIGS. 1 and 2, searching step S4 calculates the distance between the core data point 12 and the query points 13. If the distance between a query point 13 and the core data point 12 is equal to or smaller than the scanning radius R, the query point 13 will be regarded as a neighboring point 14. In this manner, only the query points 13 within the query range require the distance calculation with the core data point 12 instead of all data points 11, thereby reducing the number of times for distance calculation. As a result, the time consumption is significantly reduced.

Referring to the FIGS. 1 and 2, the grouping determination step S5 determines whether the number of the neighboring points 14 is smaller than the minimum threshold value. If so, the core data point 12 and the neighboring points 14 are regarded as noise points and the data-retrieving step S3 is re-preformed. If not, the core data point 12 and the neighboring points 14 are regarded as in the same cluster, and the first determination step S6 is performed.

Figure 3:
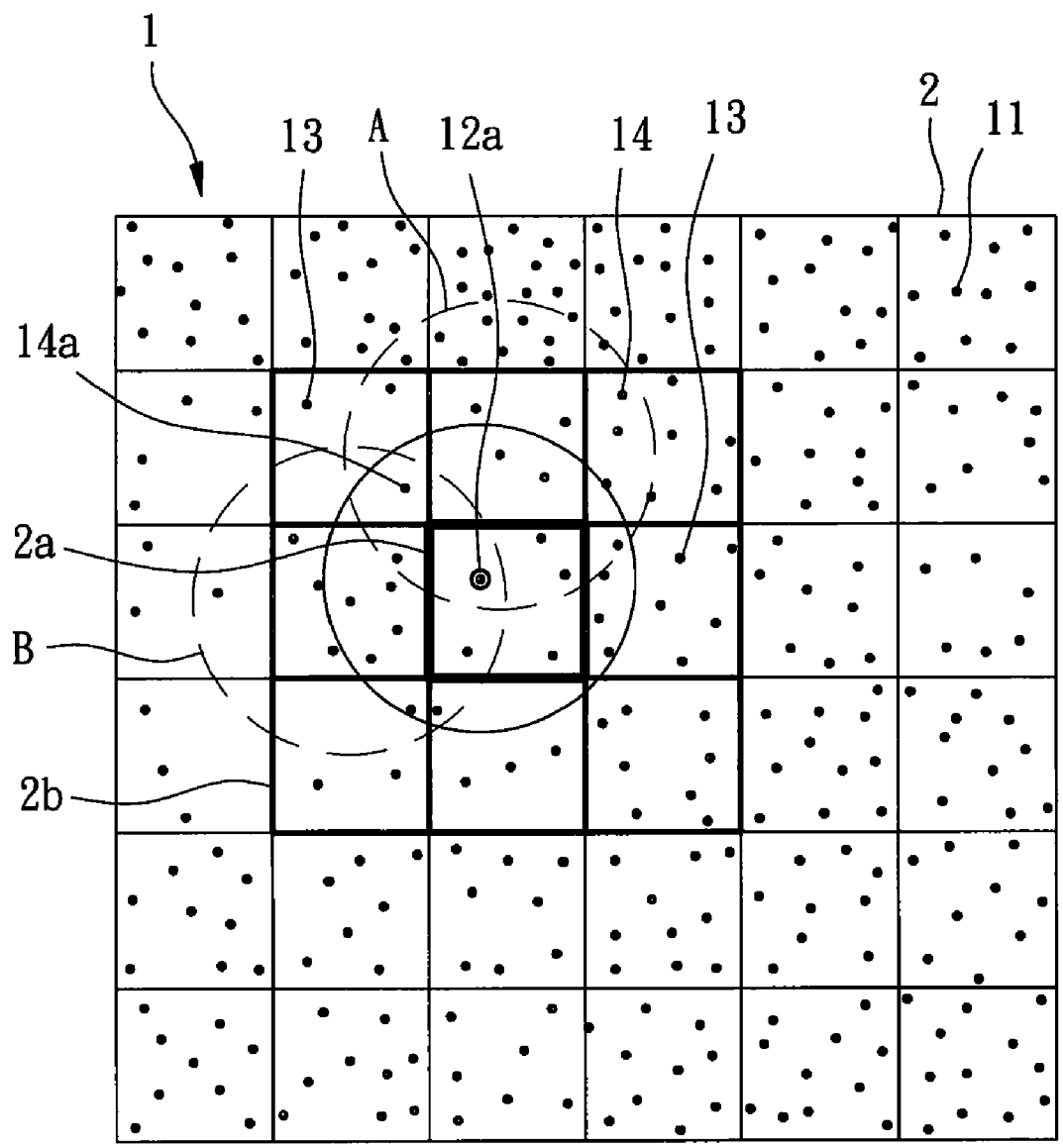
FIG. 3 is a diagram illustrating the merging process according to a preferable embodiment of the invention.

Referring to FIGS. 1 and 3, the first determination step S6 determines whether a cluster obtained in step S5 overlaps with any other cluster. If so, the second determination step S7 is performed to determine whether the two overlapped clusters are merged into the same cluster. If not, the cluster is regarded as a formed cluster and the data-retrieving step S3 is re-preformed. Specifically, referring to FIG. 3, the neighboring point 14 is belonged to a cluster A. In addition, the neighboring point 14 is also belonged to a cluster B obtained via the grouping determination step S5. Therefore, the cluster A is determined to be overlapped with the cluster B, and the neighboring point 14 within the overlapped area is defined as a cross data point 14a. Following, the second determination step S7 is performed.

Referring to FIGS. 1 and 3, the second determination step S7 regards the cross data point 14a within the overlapped area of the clusters as a cross core point 12a, and determines whether the number of the neighboring points 14 within the searching range of the cross core point 12a is smaller than the minimum threshold value. If so, the cluster merging is not performed, and the data-retrieving step S3 is re-performed. If not, the overlapped clusters are merged into the same cluster, and a termination determination step S8 is performed. Specifically, there is a plurality of query points 13 within the query range of the cross core point 12a, and the distance between the cross core point 12a and each query point 13 is calculated. If the distance between a query point 13 and the cross core point 12a is equal to or smaller than the scanning radius R, the query point 13 will be regarded as a neighboring point 14. In this manner, it is avoided to calculate the distance between the cross core point 12a and each data point 11, thereby facilitating the determination of cluster merging and improving the efficiency of data clustering.

Referring to FIG. 1, the termination determination step S8 determines whether all data points 11 have already been clustered or regarded as noise. If so, the clustering of the data set 1 is terminated. If not, the data-retrieving step S3 is re-performed.

Figure 4B:
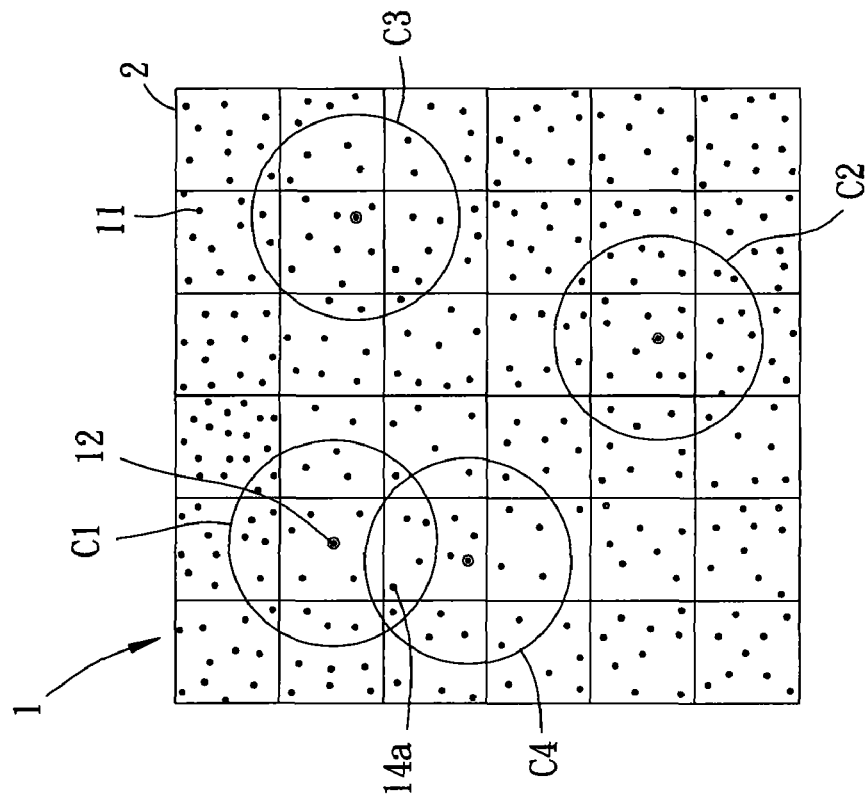
FIG. 4b is a diagram of cluster merging according to a preferable embodiment of the invention.
Figure 4A:
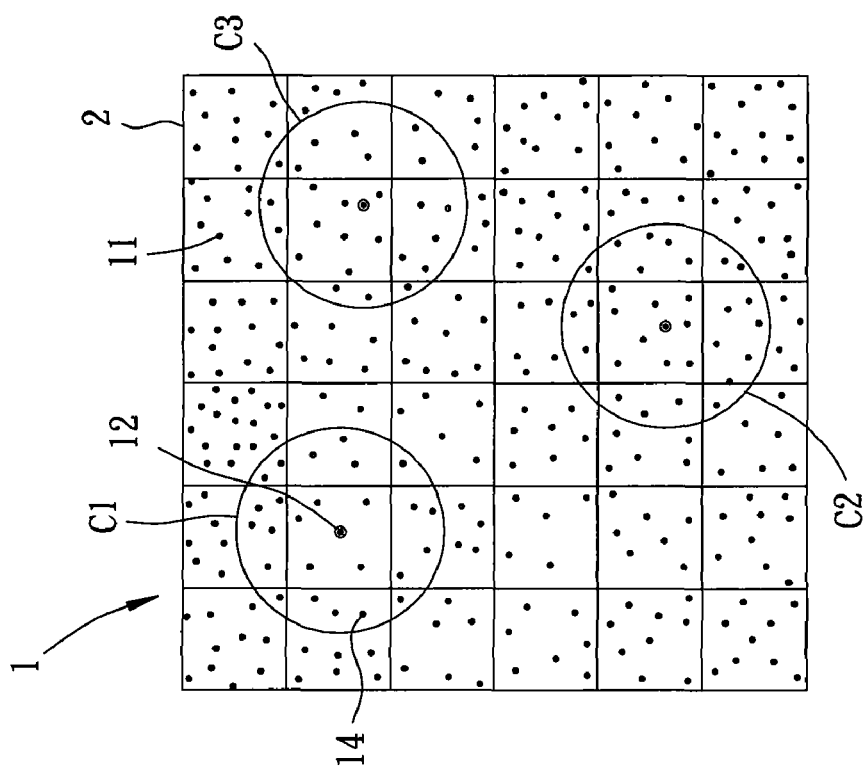
FIG. 4a is a diagram of cluster merging according to a preferable embodiment of the invention.

Referring to FIGS. 4a through 4f, an example illustrating the operation of the present density-based data clustering method is shown. Please now refer to FIG. 4a. One data point 11 out of the data points 11 is retrieved as a core data point 12, as performed by the data-retrieving step S3. A cluster C1 is obtained via the searching step S4 and grouping determination step S5, and the cluster C1 is determined not to overlap with other cluster, as performed by the first determination step S6. Therefore, the steps S3 to S6 are re-performed to obtain clusters C2 and C3, with the cluster C2 not overlapped with the cluster C3, as shown in FIG. 4a.

Figure 4D:
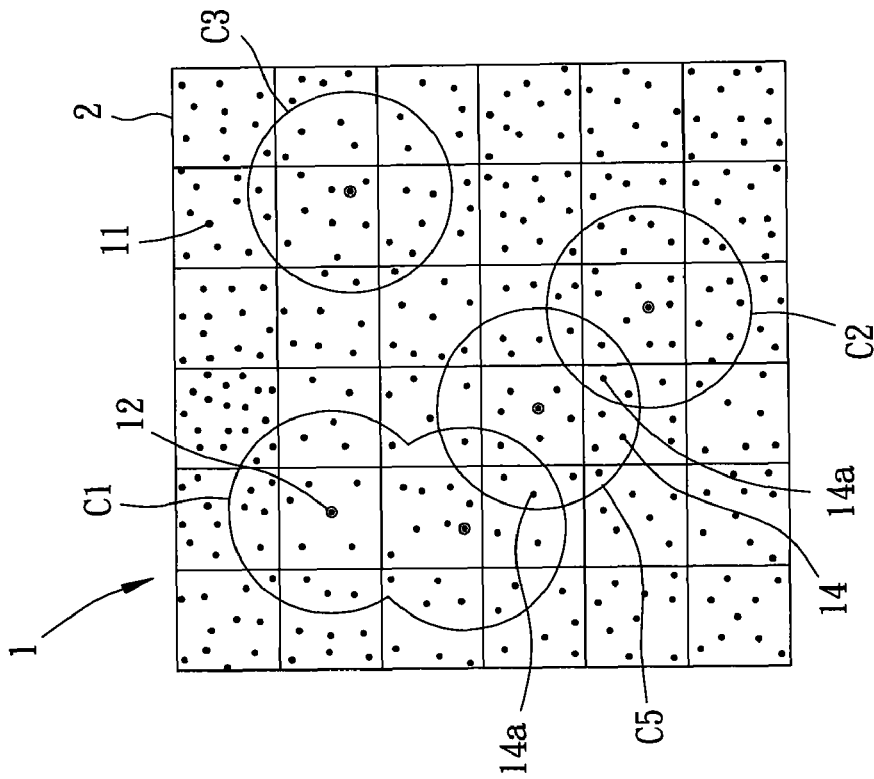
FIG. 4d is a diagram of cluster merging according to a preferable embodiment of the invention.
Figure 4C:
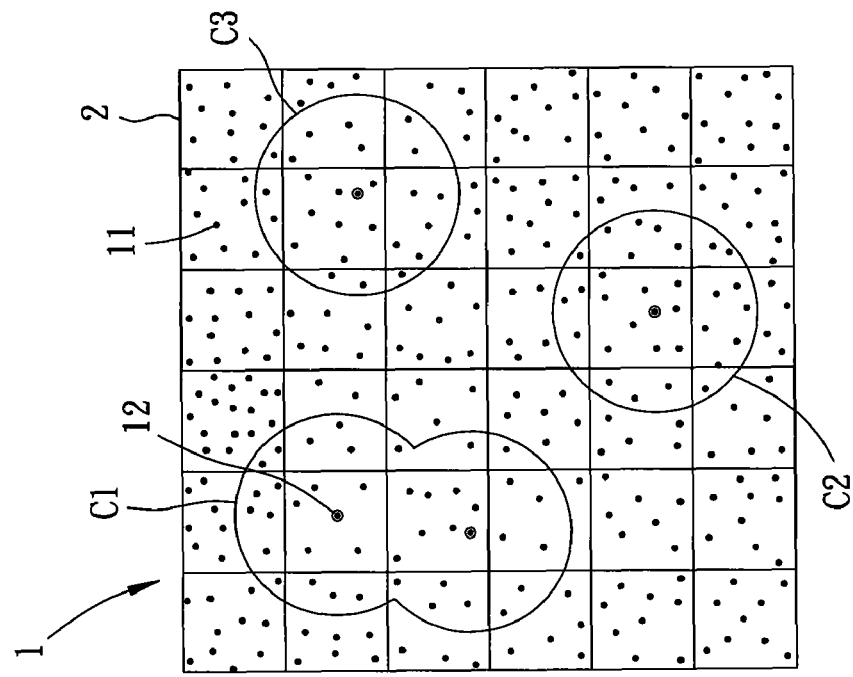
FIG. 4c is a diagram of cluster merging according to a preferable embodiment of the invention.

Referring to FIGS. 4b and 4c, another data point 11 out of the data points 11 is also retrieved as a core data point 12, as performed by the data-retrieving step S3. A cluster C4 is obtained via the searching step S4 and grouping determination step S5, and the cluster C4 is determined to be overlapped with the cluster C1, as determined by the first determination step S6. Wherein, a plurality of cross data points 14a is located within the overlapped area. Following, it is determined whether to merge the two overlapped clusters C1 and C4 into the same cluster, as determined by the second determination step S7. If the number of data points 11 of a searching range of any cross data points 14a is determined to be equal to or larger than the minimum threshold value, the overlapped clusters C1 and C4 are merged into the same cluster. In this embodiment, the number of data points 11 of a searching range of a cross data point 14a is determined to be equal to or larger than the minimum threshold value, the cluster C4 is therefore merged into the cluster C1, as shown in FIG. 4c.

Figure 4F:
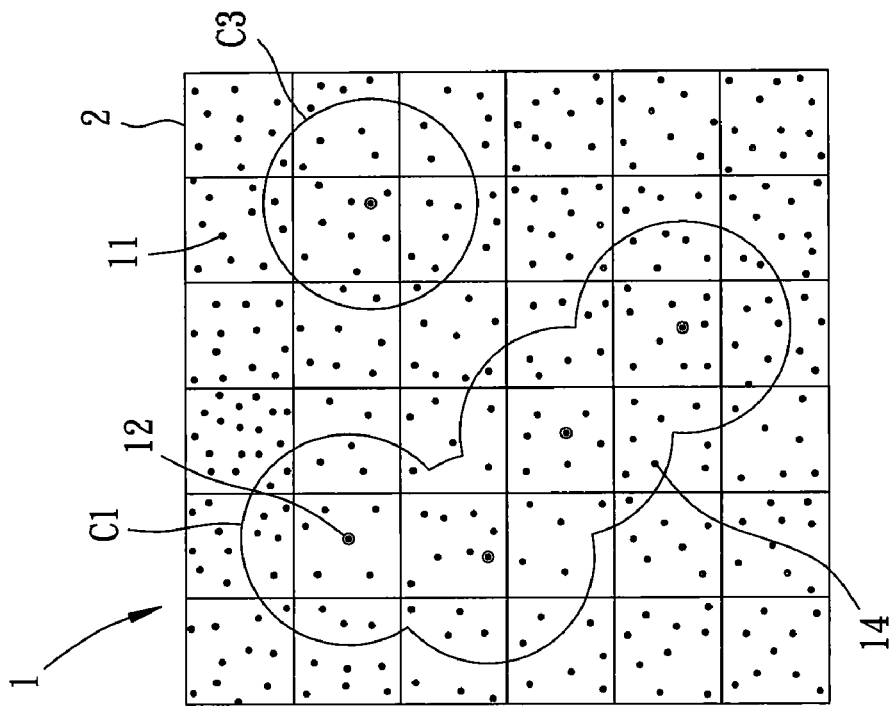
FIG. 4f is a diagram of cluster merging according to a preferable embodiment of the invention.
Figure 4E:
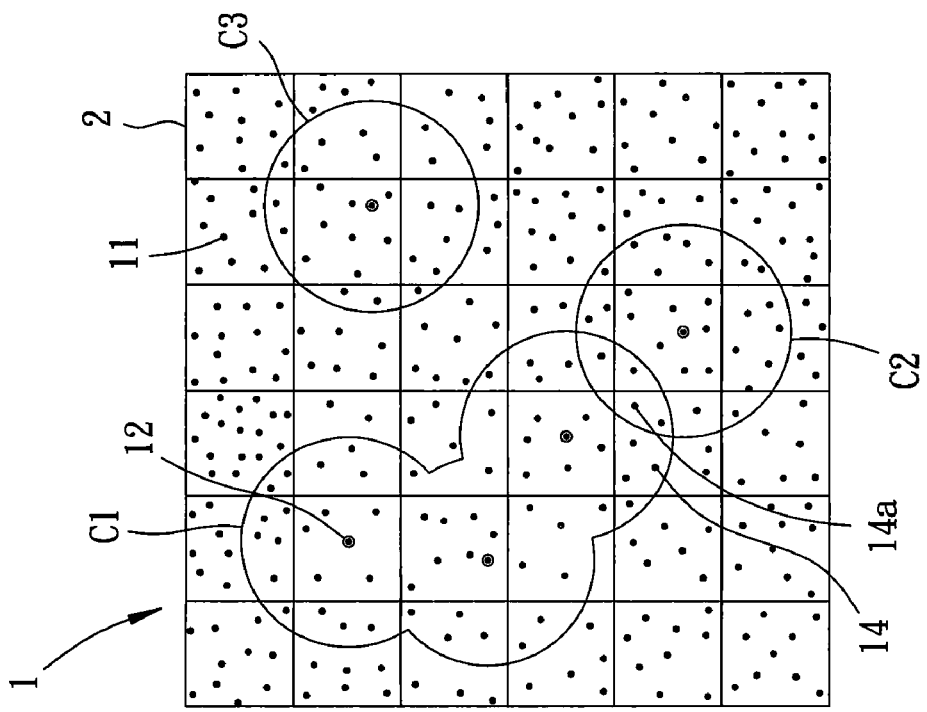
FIG. 4e is a diagram of cluster merging according to a preferable embodiment of the invention.

As determined by the first determination step S6, referring to FIGS. 4d through 4f, a cluster C5 is determined to be overlapped with both the clusters C1 and C2. Wherein, a plurality of cross data points 14a is located within the overlapped area of the clusters C1 and C5, as well as within the overlapped area of the clusters C2 and C5. In the embodiment, as determined by the second determination step S7, the number of the data points 11 within the searching range of the cross data points 14a of the overlapped area of the clusters C5 and C1 is determined to be equal to or larger than the minimum threshold value. Therefore, the cluster C5 is merged into the cluster C1, as shown in FIG. 4e. Similarly, the cluster C2 is merged into the cluster C1, as shown in FIG. 4f.

To verify the data clustering method of the invention as being efficient, the clusters A to G are used for experiment, and the result are compared with the traditional data clustering methods DBSCAN, IDBSCAN and FDBSCAN. Each of the data sets A to G all has 575,000 data points and 75,000 noise points. The data sets A to G all have different pattern of data point density. The data sets A to G respectively comprise 10, 5, 14, 4, 4, 2 and 4 clusters. In addition, the equipments used for the simulation is a Central Process Unit (CPU) of Intel Pentium D 3.4G plus a 2 GB memory, with Java being the programming language. In addition, the scanning radius R and minimum threshold value are defined in a various combinations as shown in Table 1 below:

TABLE 1

| parameter | Data Set A | Data Set B | Data Set C | Data Set D | Data Set E | Data Set F | Data Set G |
|---|---|---|---|---|---|---|---|
| Scanning Radius R | 4 | 4 | 4 | 4 | 4 | 4 | 4 |
| Minimum Threshold Value | 50 | 100 | 100 | 150 | 120 | 100 | 100 |

TABLE 2

| Algorithm | Item | Data Set A | Data Set B | Data Set C | Data Set D | Data Set E | Data Set F | Data Set G |
|---|---|---|---|---|---|---|---|---|
| DBSCAN | TC | 4257 | 4271 | 4245 | 4253 | 4210 | 4212 | 4249 |
|  | CCR | 99.99% | 99.97% | 99.99% | 99.97% | 99.99% | 99.96% | 99.99% |
|  | NFR | 98.72% | 98.04% | 97.12% | 98.12% | 97.89% | 98.10% | 96.85% |
| IDBSCAN | TC | 1475 | 2209 | 1963 | 1960 | 2078 | 2208 | 2195 |
|  | CCR | 99.99% | 99.91% | 99.97% | 99.97% | 99.99% | 99.95% | 99.99% |
|  | NFR | 97.27% | 98.81% | 97.43% | 98.26% | 97.59% | 98.28% | 97.47% |
| FDBSCAN | TC | 732.547 | 774.766 | 745.656 | 729.328 | 733.250 | 827.031 | 790.047 |
|  | CCR | 99.70% | 99.78% | 99.81% | 99.70% | 99.95% | 99.90% | 99.79% |
|  | NFR | 98.81% | 98.92% | 98.21% | 99.08% | 98.23% | 98.80% | 98.86% |
| The Invention | TC | 5.625 | 7.172 | 5.406 | 6.625 | 6.235 | 6.390 | 6.703 |
|  | CCR | 99.70% | 99.78% | 99.81% | 99.70% | 99.95% | 99.90% | 99.79% |
|  | NFR | 98.81% | 98.92% | 98.21% | 99.08% | 98.23% | 98.80% | 98.86% |

TC (second): Run Time
CCR (%): Clustering Correct Rate
NFR (%): Noise Filtering Rate Referring to the Table 2, based on the comparison result of the traditional data clustering methods and the proposed method, the proposed density-based data clustering method is capable of significantly reducing the time consumption while maintaining the high correction rate for data clustering and high filtering rate for noise, thereby proving the invention as being highly efficient.

The proposed density-based data clustering method divides the space of a plurality of data points into a grid format, with the plurality of data points distributed in the divided grids. Under the grid structure, a query range is defined based on a grid where a core data point is located as well as the surrounding grids of the grid. With the defined query range, a plurality of query points is defined. Based on this, it is only required to calculate the distance between the core data point and each query point so that the neighboring points may be determined in a faster way. With the fast determination of the neighboring points, in the grouping determination and second determination steps, it may be quickly determined whether the number of the neighboring points within the searching range of the core data point is smaller than the minimum threshold value. This efficiently reduces the amount of time for searching the data points of the data set, thereby improving the data clustering efficiency.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A density-based data clustering method executed under a computer system connected to at least a database, comprising:
   a parameter-setting step for setting a scanning radius and a minimum threshold value;
   a dividing step for dividing a space of a plurality of data points according to the scanning radius to obtain a plurality of grids, wherein the plurality of data points is distributed in the plurality of grids;
   a data-retrieving step for retrieving one data point out of the plurality of data points as a core data point, and defining a grid where the core data point is located, as well as grids that surround the grid, as a query range, wherein the data points located in the query range are query points;
   a searching step for calculating a distance between the core data point and each of the query points, determining a portion of the query points with the distance to the core data point equal to or smaller than the scanning radius, and defining the portion of the query points as neighboring points;
   a grouping determination step for determining whether a number of the neighboring points is smaller than the minimum threshold value, defining the core data point and the neighboring points as noise points and re-performing the data-retrieving step if the number of the neighboring points is smaller than the minimum threshold value, and defining the core data point and the neighboring points as a cluster and performing a first determination step if the number of the neighboring points is not smaller than the minimum threshold value,
   wherein the first determination step determines whether the cluster overlaps with other clusters, performs a second determination step if the cluster overlaps with other clusters, and defining the cluster as a new cluster and re-performs the data-retrieving step if the cluster does not overlap with other clusters,
   wherein the second determination step determines the data points located within an overlapped area of the clusters as cross core points, determines whether a number of the data points located within a searching range radially extended from any of the cross core points with a radius of the scanning radius is smaller than the minimum threshold value, re-performs the data-retrieving step if the number of the data points located within the searching range is smaller than the minimum threshold value, merges the overlapped clusters into the same cluster and performs a termination determination step if the number of the data points located within the searching range is not smaller than the minimum threshold value,
   wherein the termination determination step determines whether all of the data points are clustered or defined as noise points, terminates the density-based data clustering method if all of the data points are clustered or defined as noise points, and re-performs the data-retrieving step if not all of the data points are clustered or defined as noise points.

2. The density-based data clustering method as claimed in claim 1, wherein the second determination step further comprises:
   calculating a distance between the cross core point and each of the query points located within a query range of the cross core point; and
   defining the portion of the query points with the distance to the cross core point equal to or smaller than the scanning radius as neighboring points.

3. The density-based data clustering method as claimed in claim 1, wherein the size of the divided grids is the scanning radius.

* * * * *